United States Patent [19]

Marzocchi et al.

[11] 3,949,141
[45] Apr. 6, 1976

[54] FIBER REINFORCED ELASTOMERS
[75] Inventors: Alfred Marzocchi, Cumberland, R.I.; Nicholas S. Janetos, Columbus, Ohio
[73] Assignee: Owens-Corning Fiberglas Corporation, Toledo, Ohio
[22] Filed: May 6, 1974
[21] Appl. No.: 467,422

[52] U.S. Cl. .............. 428/378; 57/140 G; 57/153; 260/3; 260/37 R; 260/42.15; 260/75 T; 260/239 E; 428/292; 428/295; 428/379; 428/380; 428/382; 428/390; 428/391; 428/392
[51] Int. Cl.² ................ B32B 17/04; B32B 15/02
[58] Field of Search .......... 117/120 GB, 72, 161 K; 260/239 E, 75 T, 3, 42.15, 37 R; 428/292, 295, 378, 391, 392, 379, 380, 382, 390; 57/140 G, 153

[56] References Cited
UNITED STATES PATENTS

| | | | |
|---|---|---|---|
| 2,626,931 | 1/1953 | Bestian | 260/78.4 |
| 2,901,443 | 8/1959 | Starck | 260/239 E |
| 2,951,772 | 9/1960 | Marzocchi | 117/161 K |
| 3,262,991 | 7/1966 | McClendon | 260/75 T |
| 3,453,242 | 7/1969 | Schmitt | 260/75 T |
| 3,470,136 | 9/1969 | McClendon | 260/75 T |
| 3,591,357 | 7/1971 | Janetos | 117/72 |
| 3,658,571 | 4/1972 | Marzocchi | 117/72 |
| 3,684,470 | 8/1972 | Marzocchi | 117/72 |
| 3,772,229 | 11/1973 | Christena | 117/126 GB |
| 3,783,001 | 1/1974 | Marzocchi | 117/72 |

*Primary Examiner*—Ralph Husack
*Assistant Examiner*—William H. Schmidt
*Attorney, Agent, or Firm*—John W. Overman; Philip R. Cloutier

[57] ABSTRACT

A composition for use in the treatment of glass fibers or metal fibers to securely bond such fibers to elastomeric materials in the manufacture of fiber-reinforced elastomeric products containing as an essential ingredient an aziridine polyester prepared by reaction of ethylene imine with an unsaturated polyester.

34 Claims, 3 Drawing Figures

FIBER REINFORCED ELASTOMERS

This invention relates to compositions for use in the treatment of fibers, and more particularly to compositions for use in the treatment of glass and metal fibers to improve the bonding relationship between glass and metal fibers in the manufacture of fiber reinforced elastomeric products.

As used herein, the term "elastomer" is intended to mean and include natural rubber in the cured or uncured stage, vulcanized or unvulcanized stage, and syntehtic organic elastomeric materials such as nitriles, acrylic and esters and terpolymers thereof with styrene and acrylonitriles; styrene and vinyl pyridine; and synthetic rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene norbornene and the like in which the alkylidene group numbers from 2–12 carbon atoms, and polysulfone rubbers.

The term "glass fibers", as used herein, shall refer to (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air directed angularly downwardly onto mulitple streams of molten glass issuing from the bottom side of a glass melting bushing and to yarns that are formed when such discontinuous fibers are allowed to rain down gravitationally onto a foraminous surface wherein the fibers are gathered together to form a silver which is drafted into a yarn; and to woven and non-woven fabrics formed of such yarns of discontinuous fibers, and (3) combinations of such continuous and discontinuous fibers in strands, yarns, cords and fabrics formed thereof.

It is now well known that glass and metal fibers can be used as reinforecement for elastomeric materials in the manufacture of fiber-reinforced elastomeric products such as rubber tires, conveyor belts, hose, drive belts and the like. However, both types of fibers as discussed above involve their own unique difficulties.

Glass fibers, for example, are somewhat difficult to bond to elastomeric materials by reason of the fact that the glass fiber filaments are completely smooth, rod-like members which consequently make it difficult to physically interbond such elastomeric materials to the smooth glass fiber surfaces. In addition, glass fibers are characterized by highly hydrophilic surfaces, and the hydrophilic surface characteristics of the glass fibers result in the formation of a thin but tenacious film of moisture on the fiber surfaces almost immediately as the glass fibers are formed to thereby destroy any bond, chemical or physical, which might otherwise be established between the glass fibers and an elastomeric material.

Substantial progress has been made in the establishment of a secure bonding relationship between glass fibers and elastomeric materials. For example, it is now well known that the bonding relationship between glass fibers and elastomeric materials can be significantly improved by treatment of the glass fibers with an anchoring agent in the form of an organo silicon. There is, nevertheless, further room for improvement in the existing technique in securely integrating glass fibers with elastomeric materials, not only in terms of performance characteristics of the treated glass fibers, but also in terms of the costs of the materials employed in the treatment of glass fibers.

Metal fibers, like glass fibers, also have relatively smooth surface characteristics whcih render the metal fibers difficult to securely bond to elastomeric materials in the manufacture of fiber reinforced elastomeric products. In addition, corrosion of metal fibers is a significant problem which has been faced by the prior art. To insure that metal fibers have the desired fibrous characteristics, the prior art has employed metal fibers having a diameter of about 0.001 to 0.025 inches, and preferably 0.0055 to 0.015 inches. As will be appreciated by those skilled in the art, even very small amounts of corrosion seriously weaken such fibers because of their small cross-sections. In an effort to minimize corrosion, the prior art has employed steel fibers which have been plated with copper or brass, copper fibers, aluminum fibers, etc., but these metals give rise to difficulties in their own right. For example, copper ions from the copper or brass coating of steel fibers or from copper fibers tend to migrate into the elastomeric material to cause depolymerization of the rubber, thereby resulting in a loss of strength of the fiber-reinforced elastomeric product.

It is accordingly an object of the present invention to provide an improved composition for use in the treatment of glass and metal fibers in the manufacture of fiber-reinforced elastomeric products which overcomes the foregoing disadvantages, and it is a more specific object of the invention to provide a composition for use in the treatment of glass and metal fibers to securely integrate such fibers with elastomeric materials.

It is a further object of the invention to provide a composition for use in the treatment of glass fibers which is capable of establishing a secure bonding relationship between glass fibers and elastomeric materials in the manufacture of glass fiber reinforced elastomeric products.

It is another object of the present invention to provide a composition for use in the treatment of metal fibers to bond metal fibers to elastomeric material which is capable of preventing or minimizing corrosion of the metal fibers and which is capable of forming a complex withh metal ions to avoid depolymerization of rubbers.

It is yet a further object and advantage of the invention to provide treated glass and metal fibers suitable for use as reinforcement for elastomeric materials and elastomeric materials reinforced therewith.

These and other objects and advantages of the invention will appear more fully hereinafter, and, for purposes of illustration but not of limitation, embodiments of the invention are shown in the accompanying drawing in which.

The concepts of the present invention reside in a composition for use in the treatment of glass and/or metal fibers to improve the bonding relationship between glass and/or metal fibers and elastomeric materials which contain, as an essential component, an aziridine in the form of an adduct of an unsaturated polyester and ethylene imine. It has been found that the aziridine is capable of creating a strong bond between such fibers and elastomeric material in the manufacture of fiber reinforced elastomeric materials.

The aziridines employed in the practice of this invention are prepared by reaction of ethylene imine with an unsaturated polyester formed from a dicarboxylic acid having the formula wherein $x$ and $y$ are each zero or an integer from 1 to 10. $R_2$ and $R_3$ are each hydrogen or $C_1$ to $C_5$ alkyl (e.g. methyl, ethyl, propyl, etc.) or their anhydrides, and an aliphatic diol containing 2 to 30 carbon atoms.

Illustrative of such acids and anhydrides are maleic anhydride, itaconic acid, fumaric acid, glutaconic acid, 2-octendioic acid. Useful diols include alkylene glycols containing 2 to 12 carbon atoms and the corresponding polyalkylene glycols as well as numerous others.

The polyesters employed are preferably liquids having low molecular weight to assure that the ethylene imine is sufficiently reactive with the polyester. It is generally preferred that the polyester have an average molecular weight of less than 2500, and preferably within the range of 100 to 2000.

The reaction between the ethylene imine and the polyester is generally carried out by contacting the reactants, in the presence of an inert organic solvent if desired, and heating the reaction mixture. Reaction temperatures are preferably within the range of 20° to 150°C. When the use of a solvent is desired, the solvent employed should be a polar aprotic solvent (e.g. dioxane, tetrahydrofuran, DMF, DMSO, aliphatic ethers, etc.). The relative proportions are not critical and can be varied within relative broad ranges. Best results are usually achieved where the ethylene imine constitutes from 2 to 30% by weight of the final product, and preferably 5 to 20%.

Without limitation as to theory, it is believed that the ethylene imine adds across the double bond of the unsaturated polyester. This reaction may be illustrated by way of the following:

where R is the residue of the diol.

The resulting aziridine group of the polyester is quite reactive to promote the desired bonding relation with glass and metal fibers.

For example, the aziridine group of the polyester can be formulated into a conventional impregnating composition containing an elastomer latex, and preferably an elastomer latex blended with a resorcinol-aldehyde resin. In aqueous media, the aziridine ring is cleaved or hydrolyzed to provide an amine group on the polyester as follows:

The amine group, because it is cationic, has an affinity for the surfaces of the glass and metal fibers. The resulting composition can be applied as a coating on the individual glass and metal fibers, or as an impregnant in a bundle of previously sized or unsized glass fibers or a bundle of metal fibers. The resulting coating or impregnant thus serves to intertie the elastomeric material to the fiber surfaces.

It is sometimes preferred that the aziridine ring bonded to the polyester be retained prior to treatment of the glass or metal fibers with the aziridine compound. It has been found that the cleavage of the aziridine ring by protons can be substantially prevented by avoiding contact between the foregoing aziridine and materials containing proton donor groups, and particularly aqueous media. In the preferred practice of the invention, glass fibers which have been individually coated, or bundles of glass fibers which have been impregnated, with a blend of a resorcinol-aldehyde resin and an elastomer as described above are contacted with a solution containing an aziridine compound described above and an inert organic solvent for the aziridine which is also a solvent for the elastomer. It is believed that the solvent softens the surface of the coated fibers or bundles of fibers to permit the aziridine to penetrate that surface of the fibers or bundles and adhere to the fibers or bundle whereby the aziridine compound is available to bond the treated fibers with an elastomeric material in the manufacture of glass fiber reinforced elastomeric products.

In accordance with another embodiment of the invention, the aziridine polyester can be applied to the individual glass fiber filaments to form a thin coating thereon. Thereafter, the coated fibers are gathered together to form strands, yarns, cords or fabrics, referred to generally in the art as bundles, and the bundles are impregnated with an impregnating composition of the type described above formulated to include a resorcinol-aldehyde resin component and an elastomer component. Without limiting the invention as to theory, it is believed that the aziridine groups of the polyester are reactive with both the glass fiber surfaces and the methylol groups present in, for example, a resorcinol-formaldehyde resin matrix to chemically bond the impregnant to the glass fiber surfaces. The bonds established may be represented by the following:

In the application of aziridine polyester to the glass fiber surfaces described above, use can be made of aqueous or solvent media with the aziridine polyester. Where the aziridine polyester is dispersed in aqueous media, the aziridine ring is opened of hydrolyzed in aqueous medium. Where, however, use is made of an inert, aprotic solvent media, the aziridine ring remains intact until contact of the aziridine polyester with the glass fiber surfaces whereby the aziridine ring is believed to react with the Si—O— bonds on the glass surface as described above.

Impregnating compositions of the type referred to above are now well known to those skilled in the art. The compositions are generally formulated to contain from 2 to 10 parts by weight of the condensation product of resorcinol and a lower aliphatic aldehyde such as formaldehyde, acetaldehyde or propionaldehyde and 20 to 100 parts by weight of at least one elastomer. For a further description of such impregnants, reference can be made to U.S. Pats. Nos. 3,391,032; 3,402,064; 3,424,608; 3,506,476; 3,533,830; 3,567,671; 3,591,357, as well as others. For a further description of such impregnating compositions, reference can be made to the foregoing patents.

The concepts of the present invention as outlined above can also be applied in the treatment of metal fibers in the manufacture of metal fiber-reinforced elastomeric products. It is particularly advantageous in the treatment of metal fibers such as the thin metal fibers described above to employ anhydrous systems so that the aziridine ring remains intact. The presence of the aziridine ring in the coating on metal fibers or bundles of metal fibers serves as a scavenger for moisture in the coating to thereby minimize corrosion; the aziridine ring is also capable of forming a complex with metal ions, such as copper ions, present in the coating from brass-coated steel fibers. These ions otherwise cause depolymerization of rubber to thereby physically weaken the metal fiber-reinforced elastomeric material. The cleaved aziridine group is also believed to be capable of forming such metal complexes to thereby promote the overall stability of the system.

Having described the basic concepts of the invention, reference is now made to the following examples which are provided by way of illustration, but not of limitation, of the practice of the invention.

EXAMPLE 1

This example illustrates the treatment of glass fibers in the form of a bundle of glass fibers with an impregnating composition formulated to include an aziridine polyester.

An aziridine polyester is prepared by first condensing substantially equal molar amounts (1.0 mole) of diethylene glycol and maleic anhydride at a reaction temperature of about 100°C in the presence of dioxane as a solvent. After preparation of the polyester, 1 mole of ethylene imine is added to the reaction which is then refluxed for about 2 hours.

The product is found to have an average molecular weight of 229, and the solution of the aziridine polyester has a viscosity of 450 cps at 25°C. The polyester contained about 18% by weight ethylene imine as aziridine groups.

The resulting polyester is then formulated into an impregnating composition of the type described in U.S. Pat. No. 3,567,671 to form the following composition:

| Impregnating Composition | Total parts by weight |
| --- | --- |
| Sodium hydroxide | 1 |
| Resorcinol-formaldehyde resin latex (Penacolyte R 2170 - 75% solids) | 48 |
| Formalin (37% formaldehyde) | 16 |
| Vinyl pyridine-butadiene-styrene terpolymer latex (Gentac FS - 42% solids) | 900 |
| Ammonium hydroxide | 95 |
| Vinyl chloride-vinylidene chloride copolymer latex (Dow Latex 874 - 50% solids) | 350 |
| Microcrystalline paraffin wax (Vultex wax No. 5 - 56% solids) | 200 |
| Water | 932 |
| Aziridine polyester (hydrolyzed) | 127 |

The aziridine polyester constitutes about 18% by weight of the foregoing impregnant, calculated on a solids basis. However, the relative proportions are not crictical and can be varied within relatively wide ranges. For best results, the aziridine polyester constitutes from 1 to 30% by weight of the impregnant on a solids basis.

The impregnating composition is then applied by impregnation to a bundle of glass fibers which, preferably but not necessarily, have been sized as they are formed with a glass fiber size composition formulated to contain a conventional glass fiber anchoring agent in the form of an organo silicon compound.

As the organo silicon coupling or anchoring agent, use can be made of a very wide variety of silicon containing coupling agents known to those skilled in the art to be useful for this purpose. In general, suitable organo silicon compounds include organo silanes containing 1 to 3 readily hydrolyzable groups, such as halogen (bromine, chlorine, fluorine or iodine) or alkoxy having 1 to 6 carbon atoms, such as methoxy, ethoxy, propoxy, butoxy, etc., and containing at least one organic group attached directly to the silicon atom, with any remaining valences on the silicon atom being taken up by hydrogen. In aqueous solution, such silanes tend to hydrolyze to form the corresponding silanols and/or siloxanes, and hence the anchoring agent is present in the aqueous size composition of the invention as the silane, silanol and/or siloxane.

The organic group or groups attached to the silicon atom can be any of a variety of groups including alkyl having 1 to 10 carbon atoms, such as methyl, ethyl, propyl, hexyl, etc.; alkenyl containing 2 to 8 carbon atoms, such as vinyl, allyl, etc.; cycloalkyl having 4 to 8 carbon atoms, such as cyclopentyl, cyclohexyl, etc.; aryl containing 6 to 15 carbon atoms, such as phenyl, naphthyl, benzyl, etc., and the halogen, amino, hydroxy, mercapto, glycidoxy or epoxy substituted derivatives thereof. It will be understood that wherein the organo silane contains more than one organic group, the various organic groups attached to the silicon atom can be the same or different from each other.

Representative of the compounds falling within the above group are ethyldichlorosilane, propyltrichlorosilane, n-butyltrimethoxysilane, gamma-aminopropyltrimethoxysilane, delta-aminobutyltriethoxysilane, bis-(gamma-aminopropyl)dimethoxysilane, delta-aminobutylethyldimethoxysilane, beta-hydroxyethyltriethoxysilane, glycidoxypropyltrimethoxysilane, gamma-chloropropyltrichlorosilane, vinyldichlorosilane, gamma-aminoallyltrimethoxysilane, beta-aminovinyltriethoxysilane, 3,4-epoxycyclohexyltrimethoxysilane, 3-aminocyclohexylethyltriethoxysilane, para-aminophenyltriethoxysilane, methacryloxypropyltrimethoxysilane, N-(beta-aminoethyl)gamma-aminopropyltrimethoxysilane, gamma-mercaptopropyltriethoxysilane, gamma-hydroxypropyltrimethoxysilane, as well as a variety of others. In general, those silanes preferred are those in which at least one organic group is substituted by at least one amino group.

Impregnation of the sized glass fibers can be carried out by any of a variety of conventional methods. Preferred is the method illustrated in, for example, U.S. Pat. No. 3,424,608, in which the bundle is immersed in a bath of the impregnating composition and is subjected to a sharp bend while immersed therein to open the bundle and facilitate complete penetration of the solids from the impregnating composition into the bundle followed by drying of the bundle.

Figure 1:
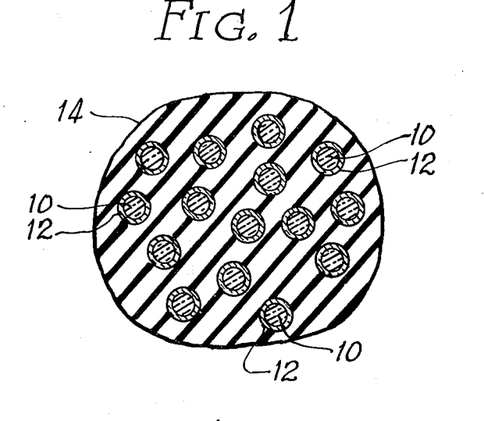
FIG. 1 is a cross-sectional view of a bundle of glass or metal fibers containing an impregnant formulated in accordance with the concepts of the invention.

The resulting bundle is illustrated in FIG. 1 of the drawing. The glass fibers 10 have an optional thin size coating 12 on the individual surfaces thereof containing the organo silicon anchoring agent. The impregnant 14 serves to completely penetrate the bundle to coat the individual fibers and separate the fibers forming the bundle each from the other and thereby define a unitary bundle structure.

The resulting bundle can be used as reinforcement for elastomeric materials in the manufacture of glass fiber-reinforced elastomeric products.

EXAMPLE 2

This example illustrates the use of another impregnating composition formulated with an aziridine polyester.

using the same procedure as described in Example 1, a polyester is prepared by reaction of 1 mole of a polyethylene glycol having an average molecular weight of 600 with 1 mole of maleic anhydride. The product is then reacted with 1 mole of ethylene imine to form the aziridine polyester having an average molecular weight of 723.

The aziridine polyester is formulated into an impregnating composition of the type described in Example 1, except that the vinyl chloride-vinylidene chloride copolymer is replaced by a dicarboxylated butadiene-styrene copolymer to form the following composition:

| Impregnating Composition | Parts by weight solids |
| --- | --- |
| Resorcinol-formaldehyde resin | 2 – 10 |
| Vinyl pyridine-butadiene-styrene terpolymer | 20 – 60 |
| Dicarboxylated butadiene-styrene copolymer (Pliolite 4121) | 15 – 40 |
| Microcrystalline paraffin wax | 3 – 30 |
| Hydrolyzed aziridine polyester | |

Water constitutes the balance of the composition and the amount of water is adjusted to provide a solids content within the range of 10 to 50% solids by weight. Application of the composition can be made in the manner described in Example 1 in an amount to deposit dry solids constituting 7 to 30% by weight of the fiber system.

Drying of the impregnant bundle is preferably carried out at an elevated temperature to accelerate removal of water and volatile components of the impregnant. It is generally desirable to dry the bundle at a temperature of 400° to 580°F although the drying temperature is not critical to the practice of the invention.

EXAMPLE 3

This example illustrates the treatment of individual glass fibers as they are formed with a composition formulated to include a resorcinol-aldehyde resin component, an elastomer component and an aziridine polyester.

Using the procedure described in Example 1, a polyester is prepared by reacting 1 mole of dipropylene glycol and 1 mole of glutaconic acid. The resulting polyester is then reacted with 0.8 moles of ethylene imine. The resulting aziridine polyester, which is a viscous liquid, is then formulated into the following composition:

|  | Parts by weight solids |
|---|---|
| Resorcinol-formaldehyde resin | 5 |
| Vinyl pyridine-butadiene-styrene terpolymer | 20 |
| Aziridine polyester (hydrolyzed) | 3 |
| Water | 150 |

Application of this composition to form a thin film coating on the glass fiber surfaces can be made in accordance with the procedure described in U.S. Pat. No. 3,424,608, in which the glass fibers, as they are formed, are pulled over a roller applicator which is constantly wet with the above composition to deposit on the glass fiber surfaces dry solids constituting from 1 to 15% by weight based on the weight of the glass fibers.

Figure 2:
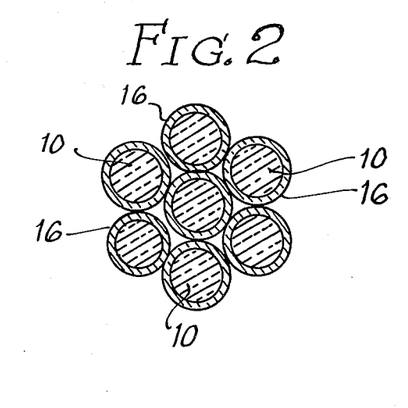
FIG. 2 is a cross-sectional view of glass or metal fibers individually coated with a composition embodying the concepts of the invention.

The resulting coated fibers are shown in cross section in FIG. 2 of the drawing; the fibers 10 have a thin coating 16 formed of the solids of the above composition. The coating 16 serves to intertie the glass fibers with elastomeric materials when the coated glass fibers are combined with such elastomeric materials in the manufacture of glass fiber reinforced elastomeric products.

The glass fibers treated as described in Example 3 can be combined with elastomeric materials directly without further processing. It is sometimes preferred, however, to form strands of coated fibers into twisted yarns, cords or fabrics, generally bundles, prior to admixture of the coated fibers with elastomeric materials in the manufacture of glass fiber reinforced elastomeric products.

When treating glass fibers as described in Example 3 with a composition embodying the concepts of this invention to form a thin film coating on the individual surfaces thereof, it is frequently advantageous to formulate the composition to include, in addition to the resorcinol-aldehyde resin, the elastomer and aziridine polyester, an organo silicon anchoring agent as described above. Such compositions may be illustrated by way of the following examples.

EXAMPLE 4

|  | Parts by weight |
|---|---|
| Resorcinol-formaldehyde resin | 5 |

-continued

|  | Parts by weight |
|---|---|
| Vinylpyridine-butadiene-styrene terpolymer | 25 |
| Dicarboxylated butadiene-styrene copolymer | 20 |
| Microcrystalline paraffin wax | 5 |
| Aziridine polyester (hydrolyzed) | 6 |
| Gamma-aminopropyltriethoxysilane | 3 |

EXAMPLE 5

|  | Parts by weight |
|---|---|
| Resorcinol-formaldehyde resin | 5 |
| Natural rubber | 30 |
| Aziridine polyester (hydrolyzed) | 5.6 |
| Gamma-mercaptopropyltrimethoxysilane | 2.1 |

EXAMPLE 6

|  | Parts by weight |
|---|---|
| Resorcinol-formaldehyde resin | 5 |
| Vinyl pyridine butadiene-styrene terpolymer | 32 |
| Vinyl chloride-vinylidene chloride copolymer | 18 |
| Microcrystalline paraffin wax | 5 |
| Glycidoxypropyltrimethoxysilane | 3 |
| Aziridine polyester | 6 |

Water constitutes the balance of the foregoing compositions and the amount of water employed is adjusted to provide the desired solids concentrations. The compositions can then be applied to coated glass fibers as described in Example 3.

It will be understood by those skilled in the art that the compositions of Examples 1 and 2 can be employed in the coating of individual glass fibers as described in Example 3, preferably with greater dilution with acqueous media. Alternatively, the compositions of Examples 3 to 6 can also be used as impregnating compositions for application to bundles of glass fibers as described in Examples 1 and 2.

EXAMPLE 7

This example illustrates the treatment of glass fibers with an elastomer treating composition formulated to include an aziridine polyester in non-aqueous media.

The elastomer composition described in U.S. Pat. No. 3,287,204 is formulated with the aziridine polyester of Example 1 to form the following:

|  | Parts by weight |
|---|---|
| Butadiene-acrylonitrile rubber (Paracril C - U.S. Rubber) | 100 |
| SFR Black | 25 |
| ZnO | 5 |
| Aminox | 0.5 |
| Lubricant (Stearic acid) | 1 |
| Dicumyl peroxide | 40 |
| Aziridine polyester | 10 |

The Paracril C in the above composition is an A-B rubber in an aromatic hydrocarbon solvent and thus, the composition is free from aqueous media to permit the aziridine rings in the polyester matrix to remain intact.

This composition can be applied to a bundle of glass fibers as an impregnant as described in Example 1 or to individual glass fibers as a size coating as described in Example 3. In either case, the elastomer and the aziridine polyester serve to securely bond the treated glass fibers with an elastomeric material constituting the continuous phase of a glass fiber reinforced elastomeric material.

EXAMPLE 8

This example illustrates the use of aziridine polyesters in the treatment of glass fibers followed by impregnation of bundles of the treated fibers.

A glass fiber treating composition is formulated with the aziridine polyester of Example 1 as follows:

|  | Parts by weight |
|---|---|
| Aziridine polyester | 10 |
| Emulsifier | 5 |
| Water | 85 |

The foregoing composition is applied to glass fibers as a size as the fibers are being formed to coat the fibers with the aziridine polyester. Since the treating composition is an aqueous system, the aziridine ring is believed to be opened as the treating composition is formulated.

Glass fibers coated with the foregoing composition are then allowed to air dry or, if desired, drying can be accelerated by exposure to an elevated temperature such as temperatures within the range of 100° to 500°F. Thereafter, the fibers are gathered together to form strands, cords, yarns or fabrics, generally referred to as bundles, for impregnation with an impregnating composition of the type described above in Examples 1 to 7 which may or may not contain an aziridine polyester.

| Impregnating Composition | Parts by wt. solids |
|---|---|
| Resorcinol-formaldehyde resin | 5 |
| Vinyl pyridine-butadiene-styrene terpolymer | 35 |
| Vinyl chloride-vinylidene chloride copolymer | 20 |
| Microcrystalline paraffin wax | 5 |
| Water to solids content of 28% | |

Impregnation of bundles of the treated glass fibers with the foregoing composition can be effected using the procedure of Example 1. The resulting impregnated bundles can then be used as a reinforcement for elastomeric materials.

EXAMPLE 9

This example illustrates the use of an aziridine treating composition of the type described in Example 8 which is formulated to include an organo silicon compound anchoring agent.

Using the aziridine polyester described in Example 2, a treating composition is formulated as follows:

|  | Parts by weight |
|---|---|
| Aziridine polyester | 10 |
| Gamma-aminopropyltriethoxysilane | 1 |
| Emulsifier | 6 |

-continued

|  | Parts by weight |
|---|---|
| Water | 84 |

The foregoing composition is applied to glass fibers to form a thin coating thereon as described in Example 8 and the coated glass fibers are then gathered together to form a bundle which is subjected to impregnation with the following composition:

|  | Parts by weight |
|---|---|
| Resorcinol-formaldehyde resin | 6 |
| Vinyl pyridine-butadiene-styrene terpolymer | 30 |
| Water to solids content of 25% | |

EXAMPLE 10

This example illustrates the use of non-aqueous media in the treatment of glass fibers with an aziridine polyester followed by impregnation.

The aziridine polyester described in Example 2 is applied to glass fibers as they are formed by coating the glass fibers with the following treating composition:

|  | Parts by weight |
|---|---|
| Aziridine polyester | 30 |
| Dioxane | 70 |

After coating, the glass fibers are allowed to air dry, and then are gathered together to form bundles which are impregnated with the impregnating composition described in Example 8.

EXAMPLE 11

This example demonstrates the concept of coating an impregnated bundle with a non-aqueous solution of an aziridine amine.

A glass fiber bundle in the form of a cord of strands of sized glass fibers which have been twisted and plied together is impregnated with the following:

| Impregnating Composition | Parts by weight solids |
|---|---|
| Resorcinol-formaldehyde resin | 5 |
| Vinyl pyridine-butadiene-styrene terpolymer | 25 |
| Vinyl pyridine-vinylidene chloride copolymer | 20 |
| Microcrystalline paraffin wax | 4 |

Thereafter, the bundle is dried and is coated with the following composition:

|  | Parts by weight |
|---|---|
| Aziridine polyester of Example 1 | 30 |
| Toluene | 400 |

Figure 3:
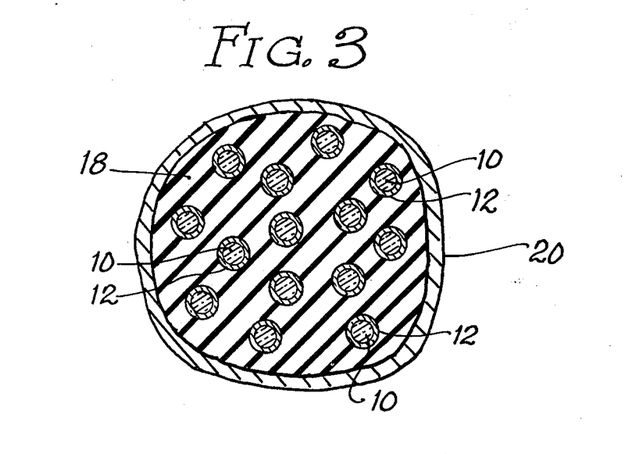
FIG. 3 is a cross-section of a bundle of glass or metal fibers which has been treated in accordance with one embodiment of the invention.

After coating, the bundle is dried in an oven maintained at 250°F. The resulting bundle is shown in cross section in FIG. 3 of the drawing. The glass fibers 10 having a thin size coating 12 on the surfaces thereof forming the bundles are separated each from the other by the solids on the impregnant 18. The aziridine polyester forms a thin coating 20 on the impregnated bundle which penetrates the surface of the bundle due to the use of a solvent such as toluene which is capable of softening the elastomer component of the impregnant. The aziridine polyester, with its aziridine groups substantially intact, is thus on the surface of the bundle available for reaction with an elastomeric material when the treated bundle is combined with elastomeric materials in the manufacture of glass fiber reinforced elastomeric materials.

EXAMPLE 12

This example illustrates the use of the concepts of this invention in the treatment of metal fibers as reinforcement for elastomeric materials.

A bundle of brass plated steel wires each having a diameter of 0.0059 inches is subjected to impregnating using the procedure and composition described in Example 1.

The resulting impregnated bundle is subjected to drying, and the dried bundle is then ready for use as reinforcement for elastomeric materials.

EXAMPLE 13

This example illustrates the use of a non-aqueous system in the treatment of metal fibers.

Using the aziridine polyester described in Example 1, a fiber treating composition is formulated as follows:

|  | Parts by weight |
|---|---|
| Butadiene-styrene rubber | 100 |
| Carbon black | 25 |
| ZnO | 5 |
| Aziridine polyester | 18 |
| Benzene | 180 |

The foregoing composition can be applied to individual metal fibers to form a coating on the surfaces thereof or as an impregnant in a bundle of metal fibers, such as the brass coated steel fibers described in Example 12. It has been found that coating or impregnant containing an elastomer and the aziridine polyester promotes the desired compatibility between the metal fibers and the elastomeric material constituting a continuous phase of a fiber reinforced elastomeric product. It has also been found that the aziridine group present in the polyester is capable of serving as a scavenger for moisture to minimize corrosion and also as a complexing agent for metal ions which would otherwise produce depolymerization of the rubber to thereby adversely affect the strength of the reinforced product.

It will be understood by those skilled in the art that the procedure described in any of Examples 1 to 10 with respect to glass fibers may also be employed in the treatment of metal fibers to promote a secure bonding relationship between such fibers and elastomeric materials in the manufacture of fiber reinforced elastomeric products.

In facilitating the combination of glass and/or metal fibers treated in accordance with the present invention with elastomeric materials, the individual fibers containing a coating on the surfaces thereof or bundles of glass fibers sized and impregnated as described above are mixed with elastomeric material or otherwise laid down in the desired arrangement for combination with the elastomeric material, as in the manufacture of fiber-reinforced belts or in the manufacture of rubber tires reinforced with cords of fibers. The combination of fibers and elastomeric material is processed in a conventional manner by molding or curing under heat and compression or vulcanized for advancement of the elastomeric material to a cured or vulcanized stage while in combination with the treated fibers or bundles of fibers whereby the fibers of bundles of fibers become strongly integrated with the elastomeric materials in the fiber-elastomeric product.

In the final system, the elastomeric material with which the fibers or bundles of fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated fibers or the impregnated bundles of fibers and the elastomeric materials forming the continuous phase occurs primarily during cure or vulcanization of the elastomeric material in combination with the treated fibers.

It will be apparent that various changes and modifications can be made in the details of procedure, formulation and use without departing from the spirit of the invention, especially as defined in the following claims.

What is claimed is:

1. Fibers having a thin coating thereon, said coating consisting essentially of the aziridine polyester consisting essentially of the reaction product of ethylene imine and a polyester formed from an acid having the formula wherein $x$ and $y$ are each 0 or integers from 1 to 10 and $R_2$ and $R_3$ are each selected from the group consisting of $C_1$ to $C_5$ alkyl and hydrogen, or its corresponding anhydride and an aliphatic polyol containing 2 hydroxy groups per molecule and containing 2 to 30 carbon atoms, said fibers being glass or metal.

2. Fibers as defined in claim 1 wherein the aziridine polyester is in a hydrolyzed state.

3. Fibers as defined in claim 1 wherein the coating also includes a blend of a resorcinol-aldehyde resin and an elastomer.

4. Fibers as defined in claim 3 wherein the fibers are glass fibers in the form of a bundle and the coating constitutes an impregnant in the bundle.

5. Fibers as defined in claim 4 wherein the glass fibers have a thin size coating on the individual surfaces thereof.

6. Fibers as defined in claim 1 wherein the fibers are metal fibers formed of a metal selected from the group consisting of steel, steel with a coating of brass, copper and aluminum.

7. Fibers as defined in claim 6 wherein the metal fibers are in the form of a bundle and the coating constitutes an impregnant in the bundle.

8. Glass fibers having a thin coating thereon, said coating consisting essentially of an aziridine polyester consisting essentially of the reaction product of ethylene imine with an unsaturated polyester formed of an aliphatic dicarboxylic acid having the formula

15 wherein x and y are each 0 or integers from 1 to 10 and $R_2$ and $R_3$ are each selected from the group consisting of $C_1$ and $C_5$ alkyl and hydrogen, or its anhydride and an aliphatic polyol containing two hydroxy groups per molecule and containing 2 to 30 carbon atoms.

9. Glass fibers as defined in claim 8 wherein the coating also includes a glass fiber anchoring agent in the form of an organo silicon compound.

10. Glass fibers as defined in claim 9 wherein the glass fibers are in the form of a bundle and the coating constitutes an impregnant in the bundle.

11. Glass fibers as defined in claim 10 wherein the glass fibers forming the bundle have a thin size coating on the individual surfaces thereof.

12. Glass fibers as defined in claim 10 wherein the bundle is formed of strands of glass fibers which have been plied and twisted together to form cords.

13. Glass fibers as defined in claim 8 wherein the coating also includes a blend of a resorcinol-aldehyde resin and an elastomer.

14. Glass fibers as defined in claim 8 wherein the aziridine polyester is in a hydrolyzed state.

15. A fiber bundle comprising a plurality of fibers, a thin coating on the surfaces of the fibers consisting essentially of an aziridine polyester consisting essentially of the reaction product of ethylene imine with an unsaturated polyester formed of an aliphatic dicarboxylic acid having the formula wherein x and y are each 0 or integers from 1 to 10 and $R_2$ and $R_3$ are each selected from the group consisting of $C_1$ and $C_5$ alkyl and hydrogen, or its anhydride and an aliphatic polyol containing two hydroxy groups per molecule and containing 2 to 30 carbon atoms, said fibers being glass or metal, and an impregnant in the bundle, said impregnant comprising an elastomer.

16. A fiber bundle as defined in claim 15 wherein the impregnant also includes a resorcinol-aldehyde resin.

17. A fiber bundle as defined in claim 15 wherein the fibers are glass fibers.

18. A fiber bundle as defined in claim 17 wherein the bundle is formed of strands of glass fibers which have been plied and twisted together to form cords.

19. A fiber bundle as defined in claim 15 wherein the fibers are metal fibers formed of a metal selected from the group consisting of steel, steel with a coating of brass, copper and aluminum.

20. A fiber bundle as defined in claim 15 wherein the aziridine polyester is in a hydrolyzed state.

21. A fiber bundle as defined in claim 15 wherein the coating also includes an anchoring agent in the form of an organo silicon compound.

22. In a fiber reinforced elastomeric product in which an elastomeric material constitutes a continuous phase in which the fibers are distributed, the improvement in the bonding relationship between the fibers and the elastomeric material wherein the fibers are coated with an aziridine polyester consisting essentially of the reaction product of ethylene imine with an unsaturated

16 polyester formed of an aliphatic dicarboxylic acid having the formula wherein x and y are each 0 or integers from 1 to 10 and $R_2$ and $R_3$ are each selected from the group consisting of $C_1$ and $C_5$ alkyl and hydrogen, or its anhydride and an aliphatic polyol containing two hydroxy groups per molecule and containing 2 to 30 carbon atoms, said fibers being glass or metal.

23. A product as defined in claim 22 wherein the coating also contains a resorcinol-aldehyde resin and an elastomer.

24. A product as defined in claim 22 wherein the aziridine polyester is in a hydrolyzed state.

25. A product as defined in claim 22 wherein the fibers are in the form of a bundle and the coating constitutes an impregnant in the bundle.

26. A product as defined in claim 25 wherein the individual fibers forming the bundle have a thin size coating thereon.

27. A product as defined in claim 22 wherein the fibers are glass fibers.

28. A product as defined in claim 22 wherein the fibers are metal fibers.

29. In a glass fiber reinforced elastomeric product wherein an elastomeric material constitutes a continuous phase in which the glass fibers are distributed, the improvement in the bonding relationship between the fibers and the elastomeric material wherein the glass fibers are in the form of a bundle of a plurality of fibers, each of the fibers having a thin coating on the surfaces thereof, consisting essentially of an aziridine polyester consisting essentially of the reaction product of ethylene imine with an unsaturated polyester formed of an aliphatic dicarboxylic acid having the formula wherein x and y are each 0 or integers from 1 to 10 and $R_2$ and $R_3$ are each selected from the group consisting of $C_1$ and $C_5$ alkyl and hydrogen, or its anhydride and an aliphatic polyol containing two hydroxy groups per molecule and containing 2 to 30 carbon atoms, and an impregnant in the bundle, the impregnant comprising an elastomer.

30. A product as defined in claim 29 wherein the impregnant also includes a resorcinol-aldehyde resin.

31. A product as defined in claim 29 wherein the aziridine polyester is in a hydrolyzed state.

32. A product as defined in claim 29 wherein the bundle is in the form of a cord of strands of fibers which have been plied and twisted together.

33. A glass fiber bundle comprising a plurality of glass fibers, each of said glass fibers having a thin film coating thereon consisting essentially of an aziridine polyester consisting essentially of the reaction product of ethylene imine with a polyester resin formed from an acid having the formula wherein $x$ and $y$ are each 0 or integers from 1 to 10 and $R_2$ and $R_3$ are each selected from the group consisting of $C_1$ and $C_5$ alkyl and hydrogen, or its corresponding anhydride and an aliphatic polyol containing two hydroxy groups per molecule and containing 2 to 30 carbon atoms, and an impregnant in the bundle, said impregnant comprising a blend of an elastomer and a resorcinol-aldehyde resin whereby the aziridine groups of the polyester react with the alkylol groups in the resorcinol-aldehyde resin to chemically bond the impregnant to the glass fiber surfaces.

34. A glass fiber bundle as defined in claim 33 wherein the bundle is formed of strands of glass fibers which have been plied and twisted together to form cords.

* * * * *